(No Model.) 2 Sheets—Sheet 1.
H. BODENSTEIN.
COOKING UTENSIL.
No. 429,256. Patented June 3, 1890.
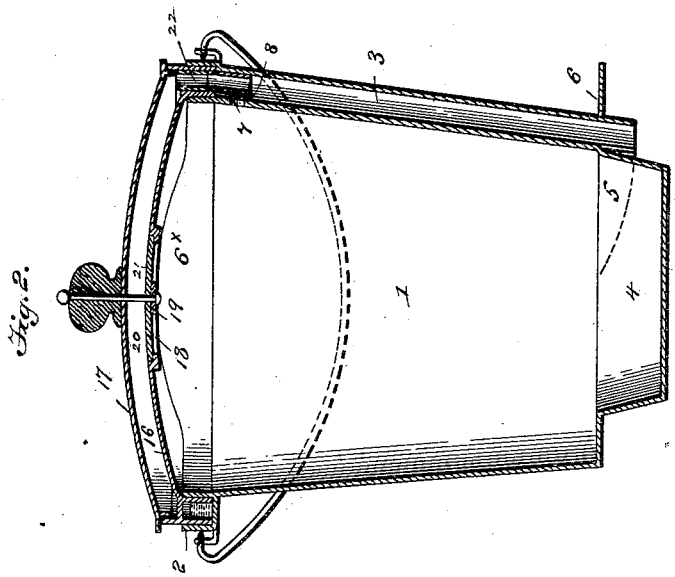
Witnesses:
Henry Bodenstein
Inventor:
By. Wm A. Moon
Attorney.

(No Model.) 2 Sheets—Sheet 2.

H. BODENSTEIN.
COOKING UTENSIL.

No. 429,256. Patented June 3, 1890.

Witnesses:

Henry Bodenstein
Inventor:

Attorney.

UNITED STATES PATENT OFFICE.

HENRY BODENSTEIN, OF STAATSBURG, NEW YORK.

COOKING UTENSIL.

SPECIFICATION forming part of Letters Patent No. 429,256, dated June 3, 1890.

Application filed January 11, 1890. Serial No. 336,643. (No model.)

*To all whom it may concern:*

Be it known that I, HENRY BODENSTEIN, a citizen of the United States of America, residing at Staatsburg, in the county of Dutchess and State of New York, have invented certain new and useful Improvements in Cooking Utensils, of which the following is a specification, reference being had therein to the accompanying drawings.

My invention relates to improvements in cooking utensils; and the leading object of my invention is the provision of a cooking utensil in which food may be boiled and roasted or baked at one time, or which can be used to boil food or to bake or roast it, as may be necessary and desirable.

A further object of my invention is the provision of a combined boiling and baking cooking utensil which will comprise few parts, thus enabling it to be manufactured and sold at a low price, and which will perform its functions either separately or combined in a perfect manner.

To attain the desired objects, my invention consists of a cooking utensil comprising a steamer, a baking or roasting compartment communicating therewith, and governing-valves, and an escape for the steam.

The invention further consists of a steamer having an escape-tube provided with a valve, a cover having a valve, and a seal between the cover and steamer.

The invention further consists of the novel features of construction, combinations, and adaptation of parts, substantially as herein illustrated, described, and specifically defined in the claims.

Figure 3:
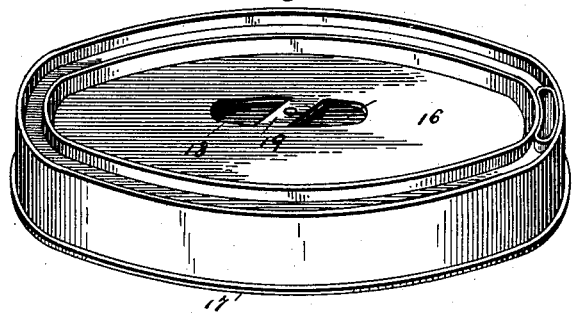
Figure 4:
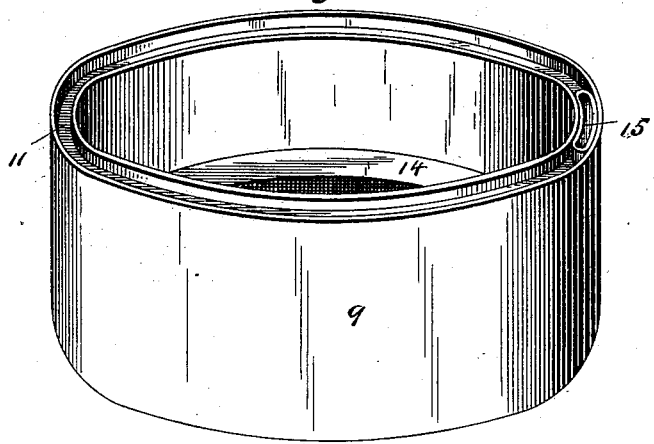
Figure 5:
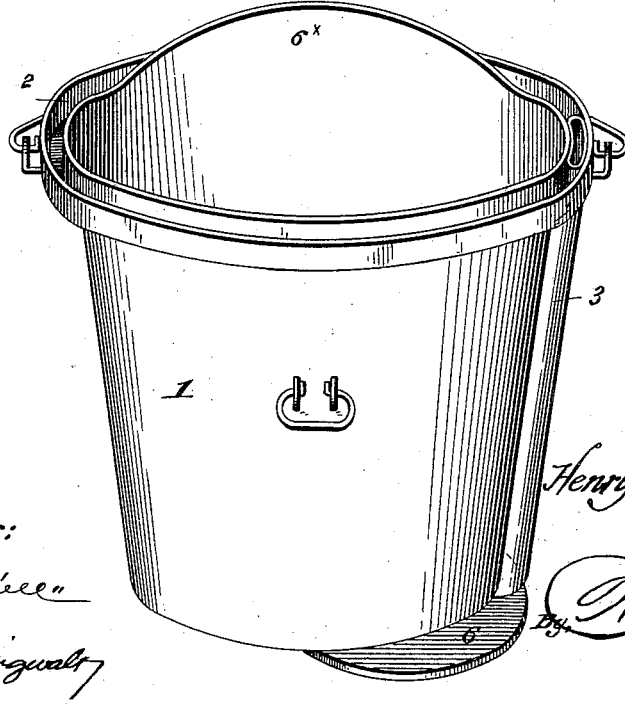

Figure 1 represents a vertical section of a cooking utensil or apparatus constructed in accordance with and embodying my invention as a combined cooker. Fig. 2 represents a vertical section thereof as a steamer or boiler. Figs. 3, 4, and 5 represent perspective views of the respective parts of my cooker to more clearly illustrate details.

Referring by numerals to the figures of the drawings, wherein similar numerals denote corresponding parts in the different figures, the numeral 1 designates a pot or vessel, which forms what I may term the "steamer" or "boiler" of my utensil, which is formed with the annular channel or passage 2 around its upper edge, communicating with which is the escape-tube 3, which extends to near the bottom of the vessel and conducts the odors arising from the food into the combustion-chamber of the stove.

The bottom 4 of the steamer is arranged eccentric to the body portion thereof, and around the odor-tube or escape-tube is a vertical depending flange 5, and extending from the side of the vessel or steamer is a horizontal flange 6, and the upper edge is raised at $6^\times$.

I provide an opening or outlet 7 in the steamer, which communicates with the escape-tube, and a flap-valve or gravity-valve 8 controls said opening. This valve consists of a disk of suitable material hinged to the vessel on the outside in close proximity to the outlet 7, so as to close the same by gravity when the steamer is not in use, and to open by the pressure of the steam when in operation.

The baking or roasting compartment of my cooker consists of the casing $9^a$ and the vessel 9, having at its lower edge flanges forming a channel 10, and at its upper edges flanges forming a channel 11. The lower channel fits in the channel 2 of the steamer and forms a water seal therewith, water being placed in the channel. The open vessel 9 is provided with a bottom 12, which is preferably made concave, and is provided near its outer edge with openings 13 to permit the entrance of steam to the vessel, and above the said concave bottom the open rest or supplemental bottom 14, on which is supported a valved and sealed pan $14^\times$, containing the meat, bread, pastry, or other food to be baked or roasted. This cooking-compartment is also provided with a conducting or escape tube 15.

The cover of my cooker consists of two sections or parts 16 and 17, the part 16 being provided with two depending flanges, which fit in the upper channel 11 of the baking-compartment, and water is placed in the channel 11, thus forming a seal between the cover and baking-compartment, and the part 16 also has a central opening 18, across which is a guide-bar 19 for the rod or stem 20, which guides the gravity-valve 21, carried by the part 17, and the part 16 has the opening 22 communicating with the escape-tube.

When it is desired to use my utensil as a combined steamer and baker, the parts are arranged as in Fig. 1. Food is placed in the steamer and sealed and valved pan in baking-compartment, and the food is boiled in the steamer and the odor therefrom is conducted through the escape-tube, and the steam from the steamer passes into the baking-compartment and heats the pan and effects a thorough baking or roasting of the food therein. The fumes or odor rising from the food in the steamer pass out through the opening therein to the escape-tube, and thus cannot impregnate the food being baked in the compartment above.

When it is desired to employ the utensil merely for roasting or baking, a small amount of water is placed in the steamer, and the steam arising therefrom passes into the baking-compartment and bakes the food which is in the pan, afterward passing out through the escape-tube.

When it is desired to use the utensil as a steam cooker, the food is placed in the vessel in a proper amount of water and the cover is applied, as clearly shown in Fig. 2. The steam arising passes through the opening of the vessel to the escape-tube, and also passes through the opening of the cover to the escape-tube, the pressure thereof operating the valves in the vessel and cover and escaping from the vessel, thus effectually performing the cooking and preventing the odor from entering the room.

It will thus be seen that I provide a cooking utensil which can be produced at such a price as to place it within reach of all, and which, from its general efficiency, recommends it to all needing such a utensil.

The valved pan in the baking-compartment allows the hot air from the food to escape and cause the food to be cooked properly. The raised portion $6^x$ at the top of the vessel and the eccentric bottom and flange allow the easy pouring of the contents of the vessel, as is evident, such raised portion serving as a spout. It will also be seen that the baking-compartment is double-walled.

I claim as my invention—

1. A cooking utensil consisting of a pot or vessel having a depending bottom eccentric to the body portion thereof, a vertical escape-tube connected with said vessel and extending to near the bottom thereof, an outlet in the upper portion of the vessel communicating with said tube, a gravity-valve hinged to said vessel and closing the outlet, a vertical depending flange secured to the lower portion of the escape-tube, and a horizontal flange connected to said tube, substantially as described.

2. The combination, with the vessel 1, having escape 3, outlet 7, and flap or gravity valve 8, of the cover 16, having two downwardly-extending and one upwardly-extending flanges, and an opening 18, and gravity-valve 21, the cover 17, fitting on the upwardly-extending flange of the cover 16, and the escape-tube 15, communicating with the escape-tube 3, substantially as described.

3. The combination, with the vessel 1, having escape 3, outlet 7, gravity-valve 8, and cover 12, having openings 13, of the baking-vessel 9, having surrounding casing $9^a$, cover 16, with opening 18, and gravity-valve 21, the cover 17, and escape-tube 15, substantially as described.

In testimony whereof I affix my signature in presence of two witnesses.

HENRY BODENSTEIN.

Witnesses:
GEO. W. SIMMONS,
JAMES E. RYER.